United States Patent [19]

Windley

[11] Patent Number: 5,330,834
[45] Date of Patent: Jul. 19, 1994

[54] DYE-RETARDED NYLON 6/6,6 BLOCK COPOLYMER FIBERS

[75] Inventor: William T. Windley, Seaford, Del.

[73] Assignee: E. I. Du Pont de Nemours and Company, Wilmington, Del.

[21] Appl. No.: 882,382

[22] Filed: May 12, 1992

[51] Int. Cl.⁵ .............................................. D02G 3/00
[52] U.S. Cl. .................................... 428/364; 428/373; 428/96; 428/97; 525/432; 525/427; 525/429
[58] Field of Search ....................... 525/432, 427, 429; 428/96, 97, 364, 373

[56] References Cited

U.S. PATENT DOCUMENTS

| | | |
|---|---|---|
| 2,193,529 | 3/1940 | Coffman . |
| 4,045,511 | 8/1977 | Nickol .................................. 525/432 |
| 4,592,940 | 5/1986 | Byth et al. ............................. 428/97 |
| 4,680,212 | 7/1987 | Blyth et al. ............................ 428/97 |
| 5,155,178 | 10/1992 | Windley ............................... 525/432 |

FOREIGN PATENT DOCUMENTS

| | | |
|---|---|---|
| 690510 | 7/1964 | Canada . |
| 841361 | 10/1951 | Fed. Rep. of Germany . |
| 1124238 | 2/1962 | Fed. Rep. of Germany . |

*Primary Examiner*—Patrick J. Ryan
*Assistant Examiner*—N. Edwards

[57] ABSTRACT

A fiber having a reduced dye rate compared to nylon 6 formed from a block copolymer of 2–30 wt % nylon 6,6 and 70–98 wt % nylon 6 which fiber has a stain resist applied thereto.

5 Claims, No Drawings

DYE-RETARDED NYLON 6/6,6 BLOCK COPOLYMER FIBERS

FIELD OF THE INVENTION

This invention pertains to fibers comprised of nylon 6/6,6 melt-blended copolymers which have reduced acid dye rates relative to nylon 6 homopolymer fibers. More specifically, it pertains to fibers spun from block copolymers prepared by melt-blending about 2–30 wt % nylon 6,6 and about 70–98% nylon 6 polymers to yield products which exhibit a reduced dye rate relative to nylon 6 homopolymer. The reduction in dye rate is enhanced synergistically by the use of a stain-blocker.

BACKGROUND OF THE INVENTION

A disadvantage of nylon 6 (poly($\epsilon$-caprolactam)) yarns is that they have a high acid dye rate that is further increased when the yarns are dyed in hot dyeing processes. This high dye strike rate makes it difficult to achieve uniform dyeing of substrates comprised of nylon 6 yarns. In many of the continuous dyeing processes used today, such as Kusters, print, spray, and fluid dyeing, the dye is applied directly to the fabric at high concentration and is rapidly fixed. There is little opportunity for dye leveling to occur as it would in a beck process.

A further disadvantage of nylon 6 yarns that results from their high dye strike rate is that they are more readily stained by various foodstuffs containing acid dyes than similar yarns made of nylon 6,6 (poly(hexamethylene adipamide)). This is true whether the yarn has been dyed by conventional dyeing processes or is undyed, e.g., either a "white" yarn or a "producer-colored" yarn which is not dyed, but colored by the addition of colored pigments to the polymer prior to spinning. For this reason, it is more difficult to eliminate staining of both dyed and undyed nylon 6 substrates, such as carpets or other textiles, by the application of stain-resist agents.

The present invention overcomes the above disadvantages by providing a means for producing nylon 6/6,6 melt-blended yarns having reduced acid dye rates, both when the yarn is undyed, but especially after dyeing. In particular a greater than expected reduction in acid dye rate is achieved upon application of a stain-blocker to the yarns. This results in both dyed and undyed products comprised of these yarns which have superior stain-resistance as compared to that of products comprised of comparable nylon 6 homopolymer yarns and equivalent at some compositions to nylon 6,6 yarns which have been treated with a stain-resist agent.

SUMMARY OF THE INVENTION

It has now been found that the acid dye rate of nylon 6 may be significantly reduced by melt-blending nylon 6 with 2–30 wt % of nylon 6,6 to form a block copolymer having two distinct melting points, one near that of nylon 6,6 and a second one near that of nylon 6. These block copolymers are more resistant to staining by acid dyes than the corresponding nylon 6 homopolymer. Aftertreatment of substrates comprised of either undyed or dyed fibers of such nylon 6/6,6 block copolymers with a stain-resist agent results in a greater than expected reduction in the rate of staining by acid dyes.

Accordingly, this invention relates to a fiber formed of a block copolymer of 2 to 30 weight percent poly(hexamethylene adipamide) and 70 to 98 weight percent poly($\epsilon$-caprolactam) having both a first melting point near that of poly(hexamethylene adipamide) and a second melting point near that of poly($\epsilon$-caprolactam) and having a stainblocker applied to the surface thereof.

DETAILED DESCRIPTION OF THE INVENTION

Melt-blending of 70–98 wt % nylon 6 and 2–30 wt % nylon 6,6 is accomplished using methods well known in the art. In a preferred process, the melt-blending is done by blending the nylon 6 and nylon 6,6 homopolymer flake in the extruder used to extrude the fibers. As is known in the art, control of the moisture content of the polymer melt and the temperature thereof can be used to obtain the desired molecular weight of the product polyamide. Typically, molecular weights of from about 12,000 to 22,000, or having a relative viscosity (RV) of 30 to about 100, are used for spinning of nylon fibers. Generally, the melt hold up time in the extruder, transfer line, and spin block should be from 4 to 12 minutes using a melt temperature of 270°–300° C. Using shortened holdup times or lower temperatures results in the product being a blend rather than a block copolymer, whereas the use of longer hold up times or higher temperatures can result in the product being an essentially random copolymer.

This invention is not limited to flake-blended nylon 6 and nylon 6,6. Other means of melt-blending known in the art may also be used. For example, nylon 6,6 may be supplied to the melt-zone of the extruder from a close coupled second extruder or the nylon 6,6 can be combined with the nylon 6 via transferline injection so long as the residence time is short enough to prevent random copolymerization of the two nylon components.

The copolymers produced by this process have been characterized as having, in general, two melting peaks which are near, but somewhat below, the melt points of the individual polymers. Typically, the lower melting point will be within 10° C. of the melting point of the nylon 6 polymer, while the higher melting point will be within 15° C. of the melting point of the nylon 6,6 polymer. The melting points can readily be determined by the use of a differential scanning calorimeter measuring the melting points of the copolymer in air. They also exhibit a trace of alpha crystal form in a predominantly gamma crystal structure, indicating that the nylon 6 and nylon 6,6 are not completely copolymerized or randomized in the melt-blending process. The melt-blended polyamides also exhibit heats of fusion of less than about 66 cal/g.

The copolymer fibers exhibit an acid dye rate that is lower than that of nylon 6 homopolymer fibers over the full range of compositions. A further, and greater than expected, decrease in this dye rate is achieved by application of a stainblocker, such as a sulphonated phenol-formaldehyde condensation product, to the fibers.

Stainblockers (also referred to herein as stain-resists or stain-resist agents) are products which impart to the yarns or carpets to which they are applied resistance to staining by acid dyes of the type commonly found in various foods and beverages. Stainblocker compositions comprising sulfonated napthol- or sulfonated phenol-formaldehyde condensation products and methods for treating polyamide carpets or carpet yarn with these compositions to render the carpets resistant to staining by acid dyes are disclosed in Ucci and Blyth U.S. Pat. No. 4,501,591, Blyth and Ucci U.S. Pat. No. 4,592,940, Blyth and Ucci, U.S. Pat. No. 4,680,212, and Greschler, Malone, and Zinnato U.S. Pat. No. 4,780,099.

Stain-resist agents comprised of mixtures of sulfonated phenol-formaldehyde condensation products with a hydrolyzed polymer of maleic anhydride and one or more ethylenically unsaturated aromatic monomers are described in Fitzgerald, Rao, Vinod, and Alender, U.S. Pat. No. 4,883,839.

Olson, Chang, and Muggli, U.S. Pat. No. 4,822,373 discloses treatment of fibrous polyamide substrates to render them resistant to staining by acid dyestuffs by applying thereto a stainblocker composition comprising (a) a partially sulfonated novolak resin and (b) polymethacrylic acid, copolymers of methacrylic acid, or combinations of polymethacrylic acid and copolymers of methacrylic acid.

Chang, Olson, and Muggli, EPO Published Application 332,342 discloses a method for imparting stain resistance to fibrous polyamide materials that involves contacting the materials with an aqueous solution comprising polymethacrylic acid, copolymers of methacrylic acid, or combinations thereof.

U.S. Pat. No. 4,940,757 to Moss et al. describes stain-resist compositions comprising the product prepared by polymerizing any of various alpha-substituted acrylic acids in the presence of a sulfonated aromatic formaldehyde condensation product.

Any of the stainblockers and methods for applying them described in the foregoing disclosures may be used in treating the fibers of this invention. The stainblocker can be applied before or after dyeing, but it is most commonly applied after the dyeing process. The stainblocker may also be applied to "producer-colored" yarns, i.e. those which are not dyed but are colored by the addition of colored pigments to the polymer prior to spinning. The effect of the stainblocker on these block copolymer fibers can be measured by a dye retardation factor, which is herein defined as the acid dye rate of the fiber before application of the stainblocker divided by the acid dye rate of the fiber after application of the stainblocker. This factor is a measure of the magnitude of the effect of the stainblocker on the acid dye rate of a fiber. The copolymer fibers of this invention exhibit dye retardation factors greater than 35 for unbulked fibers which have been twist-set in steam. It has been found that application of a sulphonated phenolformaldehyde stain-resist agent to "as processed" (unheatset) yarns spun from 2% nylon 6,6 copolymer results in a decrease in acid dye rate that is three times greater than the decrease in acid dye rate achieved by application of the same stainblocker to nylon 6 homopolymer fibers. For 6% nylon 6,6 copolymer yarns, the decrease is four times greater than that achieved for nylon 6 homopolymer yarns. The effect is not as great for steam heatset yarns where for 2% nylon 6,6 copolymer, the acid dye rate decrease is two times that achieved for nylon 6 homopolymer yarns.

TEST METHODS

Relative Viscosity (RV) is the formic acid relative viscosity as described at col. 2, lines 42–51, in Jennings, U.S. Pat. No. 4,702,875.

Amine end levels were determined by the method described beginning on page 293 in Volume 17 of the "Encyclopedia of Industrial Chemical Analysis" published by John Wiley & Sons (1973).

Melting Points were measured using a Du Pont differential scanning calorimeter in air, the temperature being raised at a rate of 2° C. per minute.

Acid dye rates were measured using the method for determining the Cold Dye Rate of scoured yarns which is described in Windley, U.S. Pat. No. 4,919,874.

EXAMPLES

The following examples are offered for the purpose of illustrating the invention and are not intended to be limiting. Percentages are by weight except where otherwise indicated.

Copolymer fibers and controls were prepared by flake blending approximately 2–15 wt % nylon 6,6 having a RV of 46 and amine ends of 40.5 with 85–98 wt % nylon 6 having a RV of 43.6 and amine ends of 51.8. For EXAMPLE 1, approximately 98 wt % nylon 6 was blended with 2 wt % nylon 6,6; for EXAMPLE 2, approximately 94 wt % of nylon 6 was blended with 4 wt % of nylon 6,6; for EXAMPLE 3, approximately 90 wt % of nylon 6 was blended with 10 wt % nylon 6,6; and for EXAMPLE 4, approximately 85 wt % of nylon 6 was blended with 15 wt % of nylon 6,6. The flake was blended at the entrance of a twin screw extruder Model 402, manufactured by Werner-Pfleiderer Corp., 663 East crescent Avenue, Ramsey, N.J. 07446. The blended flake was extruder-melted with the temperature increasing from 235° to 277° C. as the polymer progressed through the screw-melter. The temperature was then held constant at about 279° C. as the polymer passed through the transfer line, spin pump and spin pack. The residence time from the point of flake addition to the spinneret was approximately 10.5 minutes. The polymer was spun at 1.9 grams/minute/capillary into 17 filaments having a round cross-section. The filaments were air quenched and passed over a primary finish roll to a feed roll operating at a surface speed of 300 m/minute. The spun filaments were drawn at ambient temperature to 19 denier/filament (21 dtex) by rolls operating at a surface speed of 900 m/minute and then wound onto a tube at a speed of 860 m/minute. A nylon 6 homopolymer control sample was spun from nylon 6 containing no nylon 6,6 (Control A). A second homopolymer control sample of nylon 6,6 was also produced (Control B). TABLE I gives physical properties of the as-produced homopolymer and block copolymer yarns. A portion of the yarn samples were then heatset in steam in an autoclave at 132° C. using a standard carpet heatset cycle excluding oxygen.

TABLE I

| | 6/6,6 WT % RATIO | HEAT OF FUSION (CAL/G) | MELTING POINT (°C.) 6 | MELTING POINT (°C.) 6,6 | RV |
|---|---|---|---|---|---|
| Control A | 100/0 | 65.7 | 220.2 | — | 39.3 |
| EXAMPLE 1 | 98/2 | 63.7 | 217.8 | 249.9 | 40.1 |
| EXAMPLE 2 | 94/6 | 53.9 | 218.5 | 250.3 | 38.9 |
| EXAMPLE 3 | 90/10 | 56.0 | 218.7 | 250.3 | 40.9 |
| EXAMPLE 4 | 85/15 | 57.2 | 218.7 | 252.0 | 40.8 |
| Control B | 0/100 | 72.1 | — | 260.3 | 41.2 |

Undyed yarns (heatset and unheatset) to be tested for acid dye rate were scoured and then dried to obtain accurate sample weights. Yarn samples of 28–30 g were scoured using the following procedure.

A one-liter bath containing in solution 1.0 g sodium perborate and 0.25 g Igepon T-51, an anionic surfactant used as a scouring agent for removing finish oil produced by GAF Chemical Company, 1351 Alps Road, Wayne, N.J. 07470, was brought to a rolling boil. The 28-30 g yarn sample was then added with occasional stirring for 20 minutes. The sample was then removed, washed at least 3 times in tap water, then at least 3 times in distilled water or until no evidence of soap remained, squeezed as dry as possible and put into an aluminum pan.

After scouring, the pans containing yarn were placed into a forced draft oven at 40° C. overnight. They were then removed to a vacuum oven at 40° C. and dried under vacuum for 2 hours.

A portion of the scoured yarns were then treated with stainblocker according to the following procedure.

The dried scoured (and optionally heatset) yarns were placed in a beaker in a mock dye bath at pH 4 consisting of 5 grams monobasic sodium phosphate in 1000 ml water. The yarn was removed after sitting for 15 to 20 minutes at room temperature, the water pressed out, and the yarns spun and blotted to remove excess water.

A portion of the undyed, scoured, unheat-set yarns were dyed in a simulated beck dyeing procedure described below prior to treatment with the stainblocker.

A dye stock solution was prepared by addition of 1 gram of Tectilon Blue 2GL (200%) (Acid Blue C.I. 40) to 1000 ml. of water. A mock bath (pH 7) was prepared using 5 g of monobasic sodium phosphate to 1000 ml of water. Yarn samples weighing approximately 40 grams were placed in the mock bath at 21° C. for 15 minutes. A dye bath was prepared using 40 ml of the dye stock solution described above in a 40:1 liquor ratio. The dye bath was adjusted to pH 7 and placed on a hot plate. The yarn was added and the dye bath brought to a boil over a period of one hour. The bath was then boiled for one hour with stirring. The dye was then completely exhausted onto the fibers by lowering the pH to 2.

A portion of the dyed yarn samples were then treated with stainblocker according to the procedure described above. The acid dye rates of each of these dyed yarns, including those which were stainblocker-treated, were then measured. Results are shown in Table III.

TABLE III

DYED YARN PROPERTIES WITH AND WITHOUT STAINBLOCKER AFTERTREATMENT

|  | 6/6,6 WT. RATIO | DYE RATE ($\times 10^{-5}$ SEC$^{-1}$) | DYE RATE W/STAINBLOCKER ($\times 10^{-5}$ SEC$^{-1}$) | DYE RETARD'N FACTOR |
|---|---|---|---|---|
| Control A | 100/0 | 191.5 | 0.94 | 203.7 |
| EXAMPLE 2 | 94/6 | 137.4 | 0.61 | 225.2 |
| EXAMPLE 3 | 90/10 | 97.4 | 0.79 | 123.3 |
| EXAMPLE 4 | 85/15 | 91.6 | 0.23 | 398.3 |
| Control B | 0/100 | 30.4 | 0.50 | 60.8 |

The stain-resist bath was prepared by adding 1 g of a 30 wt % solution of a sulfonated phenol-formaldehyde condensation product (Mesitol NBS produced by Mobay Chemical Company, Penn Lincoln Parkway West, Pittsburgh, Pa. 15205) in ethylene glycol in 1200 ml water in an enamel bucket. The pH was adjusted to 2.0 using sulfamic acid. Forty (40) grams of fiber were added to the bath which was then heated to 80° C. The bath was maintained at 80° C. and stirred gently for 25 minutes. The yarn was then removed, rinsed, and dried overnight in an oven at 40° C. and used in acid dye rate analysis testing.

TABLE II gives acid dye rates for undyed fibers and for undyed fibers which have been treated with a stainblocker.

I claim:

1. A fiber having a surface and comprising a block copolymer of 2 to 30 weight percent poly(hexamethylene adipamide) and 70 to 98 weight percent poly($\epsilon$-caprolactam) having both a first melting point near that of poly(hexamethylene adipamide) and a second melting point near that of poly($\epsilon$-caprolactam) and having a stainblocker applied to the surface thereof.

2. A fiber of claim 1 formed of a block copolymer of 2 to 15 weight percent poly(hexamethylene adipamide) and 85 to 98 weight percent poly($\epsilon$-caprolactam).

3. A fiber of claim 2 wherein the fiber is acid dyed.

4. A fiber of claim 2 wherein the stain-blocker is a phenol-formaldehyde condensation product.

5. A fiber of claim 3 wherein the stain-blocker is a phenol-formaldehyde condensation product.

TABLE II

UNDYED YARN PROPERTIES WITH AND WITHOUT STAINBLOCKER AFTERTREATMENT

|  | DYE RATE SCOURED ($\times 10^{-5}$ SEC$^{-1}$) | DYE RATE SCOURED, W/ STAINBLOCKER ($\times 10^{-5}$ SEC$^{-1}$) | DYE RATE HEATSET ($\times 10^{-5}$ SEC$^{-1}$) | DYE RATE HEATSET, W/ STAINBLOCKER ($\times 10^{-5}$ SEC$^{-1}$) |
|---|---|---|---|---|
| Control 1 | 111.0 | 2.300 | 605.5 | 16.90 |
| EXAMPLE 1 | 102.2 | 0.734 | 559.8 | 8.94 |
| EXAMPLE 2 | 98.3 | 0.480 | 428.3 | 9.94 |
| EXAMPLE 3 | 90.2 | 1.200 | 462.3 | 8.07 |
| Control B | 21.7 | 1.080 | 64.8 | 1.31 |
|  | DYE RETARDATION FACTOR, SCOURED | | DYE RETARDATION FACTOR, HEATSET | |
| Control A | 48.3 | | 35.5 | |
| EXAMPLE 1 | 139.8 | | 62.6 | |
| EXAMPLE 2 | 204.8 | | 47.4 | |
| EXAMPLE 3 | 75.1 | | 57.2 | |
| Control B | 20.1 | | 49.4 | |

* * * * *